United States Patent [19]

Knickerbocker

[11] Patent Number: 4,656,725

[45] Date of Patent: Apr. 14, 1987

[54] CONDUCTOR INSERTION TOOL

[75] Inventor: Robert H. Knickerbocker, Cheshire, Conn.

[73] Assignee: The Siemon Company, Watertown, Conn.

[21] Appl. No.: 753,724

[22] Filed: Jul. 10, 1985

[51] Int. Cl.[4] .............................................. B23P 23/00

[52] U.S. Cl. ..................................... 29/566.4; 29/751; 29/758

[58] Field of Search ....................... 29/278, 566.4, 748, 29/751, 752, 758; 30/124, 337, 339; 7/107

[56] References Cited

U.S. PATENT DOCUMENTS

| | | | |
|---|---|---|---|
| 3,883,316 | 5/1975 | Mason | 30/124 X |
| 3,896,534 | 7/1975 | Kaufman et al. | 29/752 X |
| 4,161,061 | 7/1979 | Mason et al. | 29/278 X |
| 4,194,256 | 3/1980 | Knickerbocker | 7/107 |
| 4,408,391 | 10/1983 | Pohl | 30/124 X |
| 4,425,019 | 1/1984 | Pohl | 339/198 R |
| 4,567,639 | 2/1986 | Fasano | 29/751 X |

FOREIGN PATENT DOCUMENTS

| | | | |
|---|---|---|---|
| 964443 | 3/1975 | Canada | 29/751 |

*Primary Examiner*—John Sipos
*Assistant Examiner*—Steven P. Weihrouch
*Attorney, Agent, or Firm*—Fishman & Dionne

[57] ABSTRACT

A tool for inserting a wire between resilient contact portions of a connector is presented. The tool has a handle portion and a reversible stem portion and the stem portion includes a body portion having a pair of blades extending from opposite sides thereof. The blades are generally in the form of I-beams and, in use, the channels at either side of the beam engage the connector contact portions while the web portion of the beam serves as anvil which supports the wire in the region between the contacts during insertion. The blades each comprise a pair of spatially displaced flanged members interconnected by a web member. Each flange member has width substantially equal to the width of the body portion.

14 Claims, 7 Drawing Figures

CONDUCTOR INSERTION TOOL

BACKGROUND OF THE INVENTION

This invention is directed to hand tools for use in the insertion of conductors in solderless connectors and especially to tools for use in the installation of individual conductors of communications cables in connectors extending from terminal blocks. More particularly, the present invention relates to the establishment of solderless connections between electrical conductors, particularly insulated conductors, and closely spaced connectors in communications systems.

The present invention is particularly well suited for use with the multiple electrical connector of U.S. Pat. No. 4,381,880, which is assigned to the assignee of the present invention and is incorporated herein by reference.

The present invention has been found to be particularly useful in the communications field and especially in the telephonic art. It is common, in the installation of a telephone system, for multiple conductor telephone cables to be terminated at a mounting block which has a plurality of solderless connectors extending outwardly therefrom. The cable conductors are inserted in connectors, typically between a pair of opposed fingers, in such a manner as to establish electrical connection without resort to bonding techniques such as soldering. The connectors, and particularly the opposed fingers or other elements between which each of the cable conductors is inserted, are designed such that any insulation on the conductor is removed therefrom as the conductor is forced between the opposing elements of the connector.

In the prior art, wherein the opposing contact elements of the connectors were formed from flat stock, wire installing tools of the type disclosed in U.S. Pat. No. 4,194,256 have been designed for use by the technician. These prior wire installing tools, however, cannot be employed in the insertion of electrical conductors in the connectors of a multiple connector assembly of the type disclosed in referenced U.S. Pat. No. 4,381,880. To be more specific, referring to prior art "flat" connectors of the type known in the art as the "66 Type", which are shown in U.S. Pat. No. 3,112,147, the installing tool must be provided with an internal cavity which functions to hold the fingers or beams of the connector together as a conductor is forced therebetween. If too much spreading of the connector fingers is permitted, the fingers (typically being comprised of copper alloys), will undergo cold flow in the base regions of the fingers and there will be insufficient force applied to the conductor to insure its permanent capture between the fingers. The connectors of U.S. Pat. Nos. 4,381,880 and 4,425,019 are defined by high strength coil segments. As a conductor is forced between a pair of these opposed coil segments, the forces imposed on the outermost portions of the connector are high while those at the bottom of the cooperating elements or segments remain low. This is precisely the opposite to what occurs in a "66 Type" connector. Accordingly, there is no danger of cold flow of the copper wire which defines the connector segments. Thus, a tool cavity to prevent excessive spreading of the fingers of the connector is not required.

An attempt at providing a suitable installing tool for connectors of the type described in U.S. Pat. No. 4,381,880 was made in U.S. Pat. No. 4,408,391, assigned to the assignee, hereof, all of the contents of which are incorporated herein by reference. While suitable for its intended purpose, the installation tool of U.S. Pat. No. 4,408,391 suffers from certain defiencies and shortcomings. Chief among these problems is a lack of structural strength in the blade. Blade portions 20 and 20' of the stem portion 12 of the prior art tool have a much narrower width as compared to the center body portion 18. As a result, it has been found that blade portions 20, 20' may fracture and break during repeated usage. Accordingly, the prior art installation tool of U.S. Pat. No. 4,408,391 may become undesirably expensive in terms of labor, repair and replacement costs.

SUMMARY OF THE INVENTION

The above-discussed and other problems of the prior art are overcome or alleviated by the improved installation tool of the present invention suitable for use in conjunction with a electrical connectors of the type disclosed in U.S. Pat. No. 4,381,880. In accordance with the present invention, an installation tool is provided having blade portions of sufficient structural strength to permit continued use over long periods. The present invention is therefore an improved tool relative to the installation tool described in U.S. Pat. No. 4,408,391. The installation tool of the present invention comprises a handle and a stem portion which extends from the handle. The stem portion, viewed at one end, has a generally I-beam shape with a slot running longitudinally through a portion of the web or rib region of the I-beam. An important feature of the present invention is that both flange portions of the "I-beam" have a sufficient width so as to impart structural strength and integrity to the entire stem. This novel structure is a marked improvement over the stem and structure described in U.S. Pat. No. 4,408,391.

In a preferred embodiment of the present invention, one end of this "I-beam"; i.e., the flange portion at one side of the web or rib portion of the beam; will extend outwardly past the remainder of the stem and be shaped, at its end, to form a wire cutting edge. During insertion of conductor between the coil segments of a connector of a multi-connector assembly formed from a continuous strip of wire which has been shaped to define adjacent and abutting loops (see U.S. Pat. No. 4,425,019), the web portion of the "I-beam" will remain in contact with the portion of the conductor which is positioned between the opposing connector elements during the entire insertion procedure whereby buckling or flexing of the conductor in the connector is prevented.

The above-discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENTS

Figure 1:
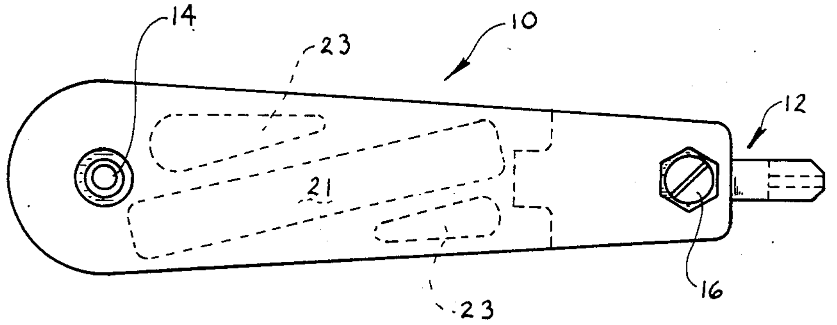
FIG. 1 is a side elevation view of a tool in accordance with the present invention.
Figure 2:
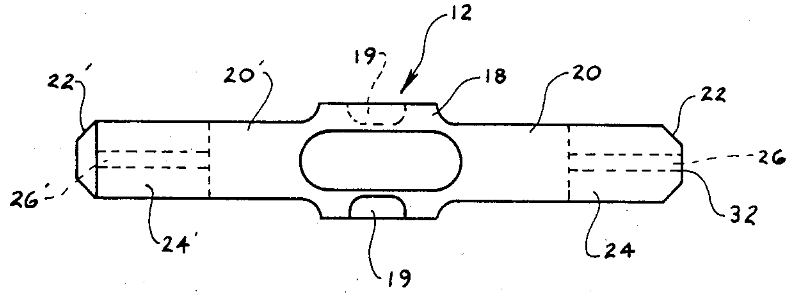
FIG. 2 is a side elevation view, on an enlarged scale, of the stem portion of the tool of FIG. 1.
Figure 3:
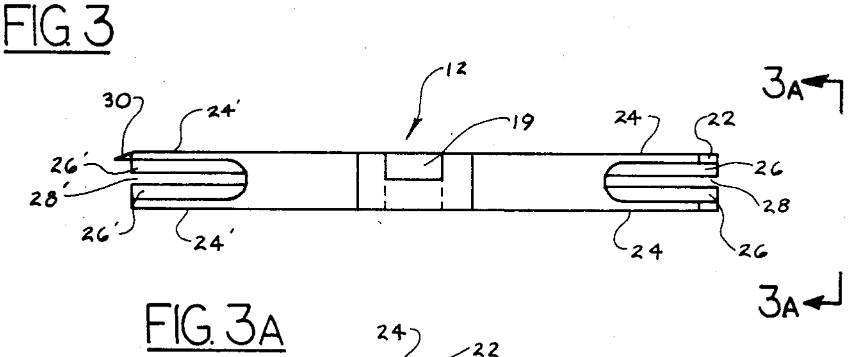
FIG. 3 is a bottom view of the tool stem of FIG. 2.
Figure 4:
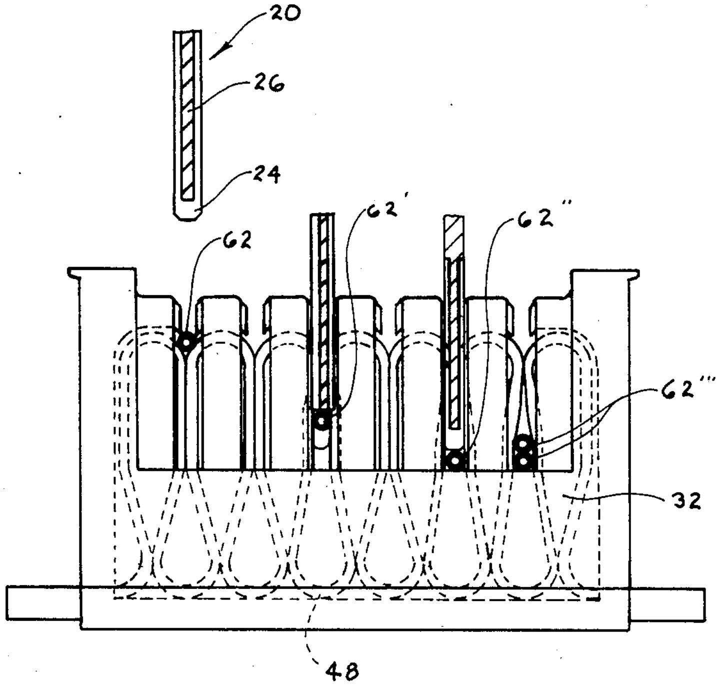
FIG. 4 is a side elevation view depicting use of the tool of FIG. 1.
Figure 5:
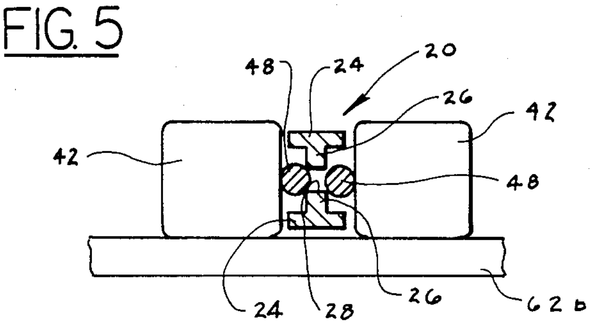
FIG. 5 is a cross-sectional end view, taken along line A—A of FIG. 4, on an enlarged scale, of the stem portion of the tool of FIG. 1, FIG. 5 showing the tool and a portion of a connector.
Figure 6:
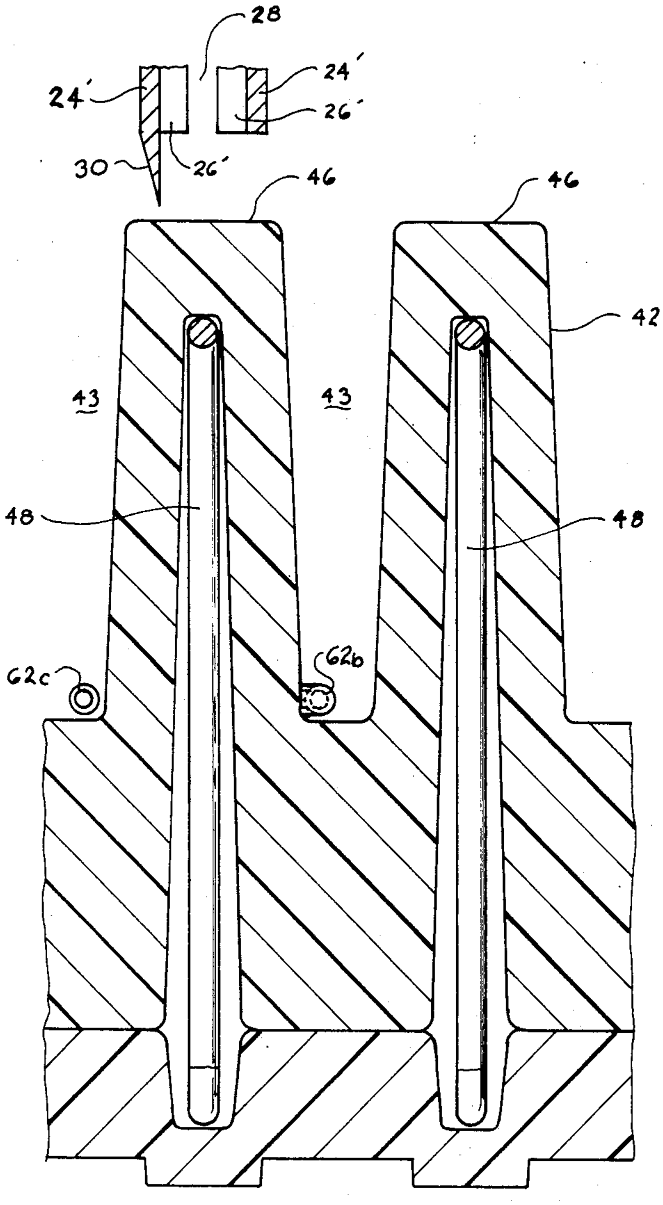
FIG. 6 is a further view, rotated 90° with respect to FIG. 4, which depicts use of the present invention.

The present invention will be described below in relation to the connector assembly of U.S. Pat. No. 4,381,880; FIGS. 4–6 showing portions of such a connector assembly in addition to the stem portion of an insertion tool in accordance with the present invention. Referring jointly to FIGS. 1–3 a conductor insertion tool in accordance with the present invention comprises a handle, indicated generally at 10, and a stem, indicated generally at 12. Handle 10 will typically be comprised of two pieces of molded plastic which are pivotally joined together at a first end by means of a rivet 14 or other suitable fastener. The two portions of the handle are shaped so as to define a stem receiving slot therebetween and the handle portions and stem are interconnected at a second end of handle 10 by means of a bolt 16 and associated nut which communicate through an aperture in stem 12. As may be seen from FIGS. 1–3, stem portion 12 of the tool is preferably reversible. The stem portion 12 thus has an intermediate body portion 18 and, extending from opposite ends thereof, a pair of blade portions which are respectively indicated as 20 and 20'. The center body portion 18 of stem 12 is of increased width when compared to the blade portions 20,20'; the body portion 18 tapering slightly inwardly to the blade portions and the entire stem 12 being formed from a single piece of material. Handle 10 preferably includes a large molded opening 21 therein capable of accepting and storing a spare stem 12. Miscellaneous spaces 23 are provided in handle 10 so as to reduce the amount of excess molding material used therein. A pair of oppositely disposed cut-out sections 19 are provided in center body portion 18. These cut-out sections aid in manufacturing and molding of the one-piece stem portion 12. At either end section of blade portions 20, 20', the blades taper slightly as identified at 22 and 22'.

Figure 3A:
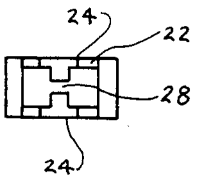
FIG. 3A is an end view of the tool stem taken along the line A—A of FIG. 3.

The shape of blade portions 20 and 20' of stem 12 may clearly be seen from a joint consideration of FIGS. 2–6. FIG. 3A is an end view of blade portion 20 and FIG. 5 is a cross-sectional view of portion 20 of the stem and shows the tool positioned between a pair of uprights 42 of a connector of the type described in U.S. Pat. No. 4,381,880. Blade portions 20 are generally of "I-beam" shape in that they have flat parallel flange members 24 and 24' separated by a rib or web member 26 having a longitudinal slot 28, through a portion thereof. As shown in FIG. 5, the opposite sides of the web member 26 of the "I-beam" will contact straight loops or coil segments of a conductor 48 which defines the connector flanges; these coil segments being formed so as to be resiliently biased toward one another. Thus, in the fabrication of a tool in accordance with the present invention, the width of the web portion of the I-beam will be selected so as to be slightly larger than the diameter of the conductor from which the pairs of cooperating segments of each individual connector are formed. It is, of course, possible to form the stem 12 so that the dimensions of the I-beam portions 20 and 20' are different.

An important feature of the present invention are the relativly wide flanges 24,24' of blades 20, 20'. These wide flanges 24, 24' of the present invention are much larger as compared to the narrow, needle like flanges 20, 20' shown in FIGS. 3 and 5 of prior art U.S. Pat. No. 4,408,391. This relativly wide width results in the presence of more material as compared with flanges 20,20' of U.S. Pat. No. 4,408,391, thereby imparting far greater strength and overall structural integrity to blades 20, 20'. The conductor insertion tool of the present invention thus provides improved durability, fewer repairs, less frequent replacement and therefore lower costs as compared to the prior art wire installation tool.

Continuing to refer to FIGS. 3 and 4, in the preferred embodiment of the present invention the thickness of rib or web member 26 of each of blade portions 20 will also be selected such that it does not exceed the diameter of the wire to be inserted in the connector. Thus, when a solid or single conductor wire is to be inserted, the thickness of web portion 26 must be less than the diameter of the wire. In the case of stranded wire, wherein the individual conductors will typically be oriented parallel rather than being twisted, the thickness of web portion 26 should approximate the diameter of a single strand and should not exceed 1½ times the diameter of a single strand.

As may best be seen from FIG. 3, also in accordance with the preferred embodiment of the present invention, a portion of web 26 is removed for a substantial portion of the length of blade portions 20 so as to define an elongated opening or slot 28, the length of the web or rib thus typically being in the range of 0.10 to 0.15 inches. Referring to the connector as shown in FIG. 4, when the tool of the present invention is employed to insert a wire between a pair of coil segments of the conductor 48, the adjacent coil segments will, because of their resiliency, move into slot 28 and into contact with one another. Thus, the provision of slot 28 minimizes the spreading of the coil segments and thus maximizes the force which the coil segments will exert on the wire during insertion. Maximizing the forces exerted on the wire by the conductor coil segments insures that the insulation will be stripped from the wire by the coil segments during the insertion procedure.

FIGS. 1 and 3 also clearly show the double-ended or reversible nature of the blade of the tool in accordance with the preferred embodiment of the invention. The first end of the tool, which includes a cutting blade 30, is used for wire insertion and subsequent severing of the inserted wire (see FIG. 6). The second or opposite end of the tool does not include a cutting blade 24 and thus presents a straight edge or anvil 32. Cutting edge 30 is preferably formed so as to have the configuration depicted in FIGS. 2 and 3; i.e., the edges are defined by angling the outside of the flange 24', from a point immediate the ends of the web 26' inwardly at a first angle and angling the other side of the flange outwardly, from the end of web 26', at a second angle. The stem 12 is, of course, reversible by removing the screw 16 so that it may be used for wire insertion only or insertion and subsequent cutting. As an alternative, the stem 12 may be provided with a cutting blade on each end.

Referring again to FIG. 4, a mounting block or connector of the type of U.S. Pat. No. 4,381,880 is shown in a front elevation view with the insulated wires of a multi-conductor communications cable depicted in various stages of insertion in the connector using a tool in accordance with the present invention. Thus, starting at the left, a first insulated wire 62 is shown positioned for insertion in the connector with the I-beam portion 26 of the tool stem positioned immediately above the conductor.

In the region of the second connector, proceeding from left to right, a second wire 62' has been shown partly inserted and the I-beam 26 has been partly broken away to show that the end of the web portion 26 of the I-beam maintains contact with the wire 62' over the entire length of the wire which is positioned between the cooperating loops of the connector 48. It is further to be noted that the forces imposed on the wire 62' by the loop segments of the connector are sufficiently strong so as to remove any insulation from the wire whereby good electrical contact will be established between the wire conductor and the wire 48 which forms the loops segments. When using stranded or very flexible single conductor wire, a tool as shown in FIGS. 1–3 may be required to insure stripping of the insulation. In either case, the wire conductor or conductors will be securely captured between the cooperating loop segments of the connector upon removal of the tool.

Proceeding further to the right, a wire 62'' is shown fully inserted in the connector block. When wire 62'' has been fully inserted, the cutting edge 30, if present, will sever the wire at a first side of the conductor; the severing action taking place as the cutting edge continues to move downwardly while further movement of the wire is prevented by the base portion 32 of the connector block.

Moving further to the right, a pair of wires 62''' are shown installed in a single connector; the installation having been accomplished employing the tool of the present invention. The tool of the present invention may be employed to insert a pair of wires in a single connector by appropriate selection of the length of the cutting blade edge extension of the I-beam. Specifically, if the tool is to be employed to install a pair of wires in a single connector, the length of the cutting blade edge is selected to be slightly less than twice the width of the wires which are being inserted in the connector.

Referring now to FIG. 6, which is an enlarged partial cross-sectional view of the FIG. 4 connector block assembly taken transversely to the FIG. 4 view, it is to be noted that the cross-pieces 46 and uprights 42 of the block define rows of channels 43 and that conductors, which will typically be brought into the connector via a fanning strip on one end thereof, are positioned within these channels; a pair of these conductors being indicated at 62(*b*) and 62(*c*) in FIG. 6. In fabricating the tool of the present invention care is taken to insure that the width of the flanged end portions of the I-beam 20,20' is less than the width of the uprights 42. Accordingly, the tool of the present invention, since its downward movement is guided by engagement of the loop segments of wire 48 with the U-shaped channels at the sides of the I-beam, cannot contact and thus damage or sever the "row" conductors 62(*b*) and 62(*c*). A row conductor 62(*b*) is also shown in FIG. 5.

While preferred embodiments have been shown and described, various modifications and substitutions may be made thereto without departing from the spirit and scope of the present invention. Accordingly, it is to be understood that the present invention has been described by way of illustration and not limitation.

What is claimed is:

1. In a wire installation tool of the type having a handle and a stem, the stem having first and second ends and being reversibly mounted on and extending from the handle, an improved stem comprising:

a body portion, said body portion being apertured to permit installation thereof in the handle;

a pair of blade means, said blade means being integral with said body portion and each comprising:

a pair of parallel spatially displaced flange members, said blade means flange members having a width substantially equal to the width of said body portion; and a web member on each of said flange members, said web members having faces parallel to each other and positioned at opposed locations on said flange members to define a longitudinal slot between said web members, said web members being generally transverse to said flange members and being positioned therebetween so as to cooperate with said flange members to define a generally U-shaped channel at either side of said web members, said U-shaped channels communicating through said longitudinal slot; and a cutting blade extension on at least one of said blade means flange members.

2. The apparatus of claim 1 wherein the thickness of said web member of each of said blade means is larger than the diameter of the individual conductors of a stranded wire to be installed with the tool and less than the total diameter of all of the conductors of the stranded wire.

3. The apparatus of claim 2 wherein the thickness of said web member is approximately 1.5 times the diameter of the smallest strand in the stranded wire.

4. The apparatus of claim 1 wherein the thickness of said web member of each of said blade means is less than the diameter of the conductor of a wire to be installed with the tool.

5. The apparatus of claim 4 wherein said web thickness is approximately 80% of the diameter of the conductor of the wire to be installed.

6. The apparatus of claim 1 wherein the width of said U-shaped channels is selected to be at least 10% greater than the maximum width of a pair of cooperating contact members between which a wire is to be installed with the tool.

7. The apparatus of claim 1 wherein said U-shaped channels are on opposite sides of each of said blades means web members and extend from points on said body portion to the end of said blade means.

8. The apparatus of claim 1 wherein said cutting blade extension projects outwardly from the end of said blade means flange member by a distance which is greater than the diameter of a single wire to be installed and less than the diameter of two of the wires to be installed.

9. The apparatus of claim 1 wherein each of said flange members terminates at an end, said end including a pair of opposed corners and including:

a tapered section on each of said opposed corners.

10. The apparatus of claim 1 wherein:

said cutting blade extension has a single angle tapered inwardly towards said web member from said flange member.

11. In a wire installation tool of the type having a handle and a stem, the stem having first and second ends and extending from the handle, an improved stem comprising:

a body portion, said body being adapted for installation in the handle;

at least one blade means, said blade means being integral with said body portion and comprising:

a pair of parallel spatially displaced flange members, said blade means flange members having width substantially equal to the width of said body portion; and a web member on each of said flange members, said web members having faces parallel to each other and being spatially displaced at opposed locations on said flange members to define a longitudinal slot between said web members, said web members being generally transverse to said flange members to define a generally U-shaped channel at either side of said web members, said U-shaped channel communicating through said longitudinal slot.

12. The apparatus of claim 11 wherein each of said flange members terminates at an end, said end including a pair of opposed corners and including:

a tapered section on each of said opposed corners.

13. The apparatus of claim 11 including:

a cutting blade extension on one of said blade means flange members.

14. The apparatus of claim 13 wherein:

said cutting blade extension has a single angle tapered inwardly towards said web member from said flange member.

* * * * *